United States Patent [19]

Loveridge et al.

[11] Patent Number: 4,833,723

[45] Date of Patent: May 23, 1989

[54] IMAGE PROCESSING METHOD FOR THE REMOVAL OF SPOT DEFECTS AND APPARATUS THEREFOR

[75] Inventors: Jennifer C. Loveridge, Middlesex; Philip G. Powell, Cheltenham, both of United Kingdom

[73] Assignee: Eastman Kodak Company, Rochester, N.Y.

[21] Appl. No.: 166,123

[22] PCT Filed: Jun. 11, 1987

[86] PCT No.: PCT/GB87/00404
§ 371 Date: Mar. 15, 1988
§ 102(e) Date: Mar. 15, 1988

[87] PCT Pub. No.: WO87/07741
PCT Pub. Date: Dec. 17, 1987

[30] Foreign Application Priority Data

Jun. 11, 1986 [GB] United Kingdom ............... 8614212

[51] Int. Cl.$^4$ ............................................. G06K 9/38
[52] U.S. Cl. .................................... 382/53; 382/52; 364/724.01
[58] Field of Search .................. 382/52, 53, 54, 27; 364/724

[56] References Cited

U.S. PATENT DOCUMENTS

| | | |
|---|---|---|
| 4,442,454 | 9/1985 | Powell. |
| 4,541,116 | 9/1985 | Lougheed. |
| 4,571,635 | 2/1986 | Mahmoodi ............... 382/54 |
| 4,630,307 | 12/1986 | Cok ............................ 382/27 |
| 4,644,410 | 2/1987 | Schichtig ................. 382/53 |
| 4,747,156 | 5/1988 | Wahl .......................... 382/54 |
| 4,760,541 | 7/1988 | Weygandt ................. 324/53 |

OTHER PUBLICATIONS

Pratt; "Digital Image Processing"-Wiley-1978, p. 319.

*Primary Examiner*—Reinhard J. Eisenzopf
*Assistant Examiner*—Jose M. Solis
*Attorney, Agent, or Firm*—Thomas H. Close

[57] ABSTRACT

A method for processing an image for the removal of spot defects comprising scanning and sampling the image to generate any array of pixel image values and constructing a corresponding array of pixel image values for the processed image by carrying out the following steps: (a) examining the image values of each pixel of a predetermined subset of pixels in a block surrounding a central pixel thereby determining the image value corresponding to the highest and lowest values in said predetermined subset of said block ($A_{high}$ and $A_{low}$ respectively), (b) determining the image value corresponding to the central pixel of said block ($A_{center}$), (c) calculating either the ratio: $R_1 = (A_{low} - A_{center})/(A_{high} - A_{low})$ or the ratio $R_2 = (A_{center} - A_{high})/(A_{high} - A_{low})$, (d) if the ratio is positive and its value is above a predetermined threshold value, writing an average value calculated on image values in the block to the element of the processed image array corresponding to said central pixel or, if not, writing the existing value ($A_{center}$) to said element, and (e) repeating steps (a) to (d) until every pixel has been processed as the central pixel.

16 Claims, No Drawings

IMAGE PROCESSING METHOD FOR THE REMOVAL OF SPOT DEFECTS AND APPARATUS THEREFOR

TECHNICAL FIELD

The present invention relates to image processing methods and apparatus for removing spot defects from an image reconstructed from processed image signals generated by scanning and sampling an original image.

BACKGROUND ART

Such a process takes the form of dividing up the original image into image elements or "pixels", generating an array of image values representative of the content of these pixels, processing these pixel image values so as to remove or reduce unwanted components therein and constructing an array of pixel image values corresponding to the desired processed image.

Images, in particular those scanned and displayed electronically, may be degraded by several forms of noise, including:

(1) Broadband noise affecting all pixels, for example photographic grain. A variety of image processing techniques have been proposed using filtering and transform methods for the suppression of broadband noise, e.g. in U.S. Pat. No. 4,442,454

(2) Noise consisting of randomly distributed modifications of image values corresponding to single or small groups of pixels. Such an effect has been referred to as "salt and pepper" noise because it may consist of random white and/or black spots. These may arise at various stages, including:

(a) in the formation of the original image,
(b) during image sampling, or
(c) in image data handling.

Methods to detect and remove isolated spot defects are described in Rosenfeld, A. and Kak, A. C., "Digital Picture Processing", Academic Press, 1976, and Pratt, W. K., "Digital Image Processing", Wiley, 1978. These procedures calculate the difference between the central pixel value and either the mean or the extreme of its neighbourhood pixels. The central pixel is replaced by a local average value if the difference exceeds an absolute threshold.

Such a technique inevitably results in loss of overall sharpness of the image as a large amount of high frequency information is lost especially in cases where the nature of the image and the spot defects necessitate the use of a low threshold.

SUMMARY OF THE INVENTION

The present invention provides a method which removes unwanted spot defects without unduly affecting overall sharpness for images even in cases in which the spot defects have image values less than the maximum or greater than the minimum values.

According to the present invention there is provided a method for processing an image for the removal of spot defects comprising scanning and sampling the image to generate an array of pixel image values and constructing a corresponding array of pixel image values for the processed image by carrying out the following steps:

(a) examining the image values of each pixel of a predetermined subset of pixels in a block surrounding a central pixel thereby determining the image value corresponding to the highest and lowest values in said predetermined subset of said block ($A_{high}$ and $A_{low}$ respectively), (b) determining the image value corresponding to the central pixel of said block ($A_{centre}$), (c) calculating either the ratio:

$$R_1 = \frac{A_{low} - A_{centre}}{A_{high} - A_{low}}$$

or the ratio $$R_2 = \frac{A_{centre} - A_{high}}{A_{high} - A_{low}}$$

(d) if the ratio is positive and its value is above a predetermined threshold value, writing an average value calculated on image values in the block to the element of the processed image array corresponding to said central pixel or, if not, writing the existing value ($A_{centre}$) to said element, and (e) repeating steps (a) to (d) until every pixel has been processed as the central pixel.

By using the value $R_1$ in step (c) low image value spot defects will be corrected. Alternatively by using $R_2$ high image value spots will be corrected. If both $R_1$ and $R_2$ are calculated in step (c) and the corrected value is written to the processed image array if either of $R_1$ and $R_2$ is positive and above the threshold value both types of defect will be corrected. Only one of them, of course, can be positive for each block location.

It is preferred that the predetermined subset of pixels of step (a) comprises all the pixels lying on the periphery of the block. In a (3×3) pixel block there are, of course, 8 peripheral pixels and one central one; however in a larger block, such as a (5×5) pixel block, there are 16 peripheral pixels, one central pixel and eight intermediate ones. It might sometimes be desirable to take account of these intermediate pixels.

The average value referred to in step (d) may be obtained by calculating the median or the arithmetic mean of all the pixel image values in the block except for the central pixel. Alternatively less than all the possible pixel image values could be used, eg just the peripheral ones, or a system of weighting these values could be employed.

DESCRIPTION OF THE PREFERRED EMBODIMENTS

The simplest way to implement the present method is by comparison of the value of each central pixel with the eight pixels values in the immediate (3×3) neighbourhood, of which the value of the smallest, A(1), and the largest, A(8), are noted. In this case the neighbourhood range, $A_{high} - A_{low}$, is determined by the difference between these two values, Range = A(8) − A(1).

Similarily, the central-neighbourhood difference is, in this case:

A(1) − $A_{centre}$ (for the calculation of $R_1$)
or
$A_{centre}$ − A(8) (for the calculation of $R_2$).

If the difference is zero or has a negative value, then the central pixel is assumed not to be a defect, its value is unchanged, and the process is repeated for the next pixel.

Otherwise the ratio $R_1$ or $R_2$ is calculated. If the value of the ratio is above the predetermined value, the value of the corresponding pixel in the processed image array is set to an average value calculated on the image values in the block. At its simplest this value is the median or, preferably, the arithmetic mean of the eight peripheral image values in the block. The pixel value remains unchanged if the ratio is below the level of the threshold: it is assumed to represent either image detail or broadband noise.

The predetermined threshold is dependent on the image and defect characteristics, and is optimised to remove the maximum number of spot defects whilst having the minimum effect on image information. Experiment indicates that the threshold may be set to a very small value before perceptibly degrading the image. A suitable ratio threshold for a typical photographic image is around 0.25 when the pixel block is (5×5) and the predetermined subset comprises the peripheral pixels. It is to be understood however that the actual value adopted will depend upon the sharpness of the original image.

An algorithm which employs a (3×3) neighbourhood is unable to detect any spot defects other than single pixels. Experiment indicates that some spot defects are larger than single pixels hence are not detected, and so remain in the resultant images.

An improvement is achieved by the use of the sixteen perimeter pixels of a (5×5) block as the comparison subset, which will permit the detection of a larger spot defect within the perimeter. There is a chance, however, that other spot defects may overlap the (5×5) perimeter itself, which will reduce the chance of detecting the central spot. This problem can be reduced by writing each corrected central pixel image value back into the original array and not using a separate array to record the processed image values. Subsequent steps will then use the corrected values already determined by the processing in earlier steps. The effect of this is to increase the efficiency of spot defect removal considerably with no visible detriment to the picture information.

The performance can be also be improved in two further ways. The first is to ignore the most extreme or the two most extreme image values of the smallest or largest pixel image values of the predetermined subset of each block when calculating $R_1$ or $R_2$ respectively. For example, if the subset represents the 16 peripheral pixels of a (5×5) block and the method is being carried out to reduce only low image value spot defects, the ratio $R_1$ will become:

$$R_1 = \frac{A(3) - A_{centre}}{A(16) - A(3)}$$

where, as before, A(1) to A(16) are ranked in image value, $A_{(16)}$ being the highest. If the method is being carried out to reduce only high image value spot defects, the ratio $R_2$ will become:

$$R_2 = \frac{A_{centre} - A(14)}{A(14) - A(1)}.$$

This will reduce the interference on the removal of spots by the remaining defects, and also by any image detail information that may lie in the neighbourhood. In the case of the (5×5) block the exclusion of only the most extreme pixel value from the operation leaves many defects undetected, whilst excluding the three most extreme pixel values visibly reduces the image sharpness to a small degree.

Secondly, it is possible to further reduce the interference of picture detail on spot removal, although not to eliminate it, by operating the algorithm only on the high-frequency content of the image. The effect of high-pass filtering is to leave the amplitude of single pixel and small area defects almost unchanged, while considerably reducing the amplitude of low-frequency fluctuations within the neighbourhood. If a spot is detected in the high-pass image of the pixel value is set to zero: this corresponds to replacing the value in the full bandwidth image with a weighted average of the image values of all the pixels in the neighbourhood.

It is possible to apply the spot defect removal algorithm to image data either before or after broadband noise suppression. However, the reduction of noise fluctuations in the area of the neighbourhood due to the noise suppression algorithm described in U.S. Pat. No. 4,442,454 permits the present defect removal algorithm to operate most efficiently if noise suppression is performed first.

The present invention also provides an apparatus comprising means for sampling the brightness of an image at a regular array of locations and providing an orderly sequence of pixel image values as input to means for processing said values according to the method of the present invention and generating a sequence of modified pixel image values that correspond to sampled brightness values of the processed image.

We claim:

1. A method for processing an image for the removal of low and/or high value spot defects comprising scanning and sampling the image to generate an array of pixel image values and constructing a corresponding array of pixel image values for the processed image by carrying out the following steps:
   (a) examining the image value of each pixel of a predetermined subset of pixels in a block surrounding a central pixel thereby determining the image value corresponding to the highest and lowest values in said predetermined subset of said block ($A_{high}$ and $A_{low}$ respectively),
   (b) determining the image value corresponding to the central pixel of said block ($A_{centre}$),
   (c) calculating the ratio:

$$R_1 = \frac{A_{low} - A_{centre}}{A_{high} - A_{low}}$$

if low values are to be corrected, the ratio $$R_2 = \frac{A_{centre} - A_{high}}{A_{high} - A_{low}}$$

if high value are to be corrected, and both $R_1$ and $R_2$ if low and high values are to be corrected; and
   (d) if a ratio is positive and its value is above a predetermined threshold value, writing an average value calculated on image values in the block to the element of the processed image array corresponding to said central pixel or, if not, writing the existing value ($A_{centre}$) to said element.

2. A method as claimed in claim 1 in which both $R_1$ and $R_2$ are calculated in step (c) and in which the corrected value is written to the processed image array if either of $R_1$ and $R_2$ is positive and above the threshold value.

3. A method as claimed in claim 1 wherein the size of the block is (3×3) pixels.

4. A method as claimed in claim 1 wherein the size of the block is (5×5) pixels and the predetermined subset of pixels of step (a) comprises the peripheral pixels of the block.

5. A method as claimed in claim 1 in which the average value of step (d) is the arithmetic mean of the pixel image values of the predetermined subset.

6. A method as claimed in claim 1 wherein the corrected image values are written back to the original image array and subsequent processing utilizes any already corrected image values.

7. A method as claimed in claim 1 wherein the most extreme or the two most extreme smallest or largest image values of each predetermined subset of pixels in the block are ignored when calculating $R_1$ or $R_2$ respectively.

8. A method as claimed in claim 1 further including the step of forming a high pass version of the image and in which the processing is performed on the high pass version of the image which, after said processing, is recombined with a complimentary low pass version.

9. An apparatus comprising means for sampling brightness of an image at a regular array of locations and providing an orderly sequence of image signal values and means for processing said image signal values to generate a sequence of modified image signals values that correspond to sampled brightness values of the processed image, said processing means including:
  (a) means for examining the image values of each pixel of a predetermined subset of pixels in a block surrounding a central pixel thereby determining the image value corresponding to the highest and lowest values in said predetermined subset of said block ($A_{high}$ and $A_{low}$ respectively),
  (b) means for calculating the ratio:

$$R_1 = \frac{A_{low} - A_{centre}}{A_{high} - A_{low}}$$

if low values are to be corrected, where A centre is the value corresponding to the central pixel of the blocks, the ratio $$R_2 = \frac{A_{centre} - A_{high}}{A_{high} - A_{low}}$$

if high value are to be corrected, and both $R_1$ and $R_2$ if low and high values are to be corrected; and
  (c) means for writing an average value calculated on image values in the block to the element of the processed image array corresponding to said central pixel if a ratio is positive and its value is above a predetermined threshold value, or if not, writing the existing value ($A_{centre}$) to said element.

10. The apparatus claimed in claim 9 wherein the calculating means calculates both $R_1$ and $R_2$ and said writing means writes the average value if either $R_1$ and $R_2$ is positive and above the threshold.

11. The apparatus claimed in claim 9, wherein the size of the block is (3×3) pixels.

12. The apparatus claimed in claim 9, wherein the size of the block is (5×5) pixels and the predetermined subset of pixels examined by the examining means is the peripheral pixels of the block.

13. The apparatus claimed in claim 9, wherein the average value calculated by the calculating means is the arithmetic mean of the pixel image values of the predetermined subset.

14. The apparatus claimed in claim 9, wherein the corrected image values written by said writing means are written back to the original image array of pixel values, and the examining means employs the corrected image values in further processing of the image.

15. The apparatus claimed in claim 9, wherein the examining means ignores one or more of the most extreme smallest or largest image values of each predetermined subset of pixels in the block when calculating $R_1$ or $R_2$, respectively.

16. The apparatus claimed in claim 9, further including: high pass filter means for forming a high pass filtered version of the image, and wherein said examining, calculating, and writing means operate on said high pass filtered image to produce a processed high pass filtered image; and means for combining said processed high pass filtered image with a complimentary low pass version of the image.

* * * * *